(No Model.)
H. C. LEES.
CORD AND TASSEL.
No. 464,791. Patented Dec. 8, 1891.
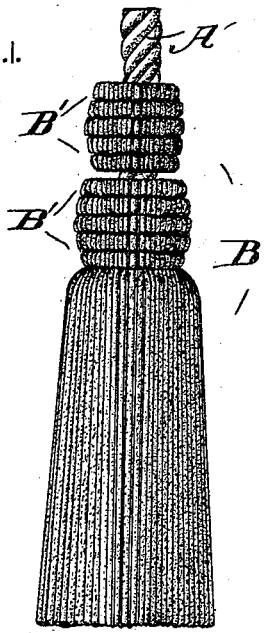
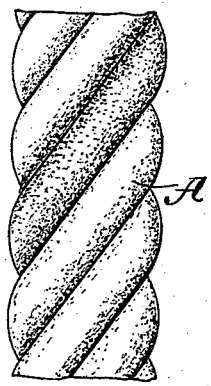
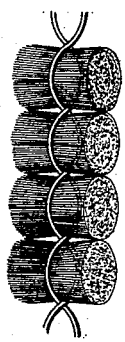
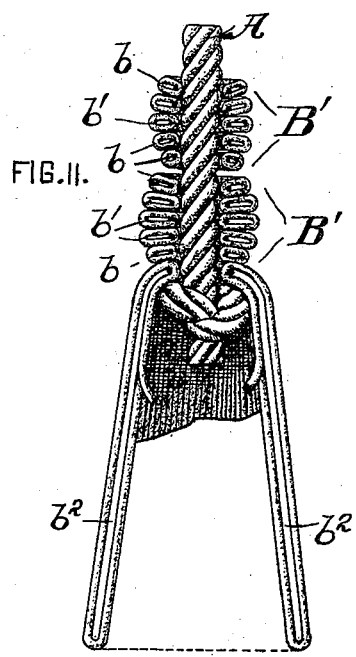
Witnesses
Wm. S. Hoffman
S. Martin
Inventor
Henry C. Lees
by Francis D. Pastorius
Attorney

UNITED STATES PATENT OFFICE.

HENRY C. LEES, OF CAMDEN, NEW JERSEY.

CORD AND TASSEL.

SPECIFICATION forming part of Letters Patent No. 464,791, dated December 8, 1891.

Application filed September 23, 1891. Serial No. 406,539. (No model.)

*To all whom it may concern:*

Be it known that I, HENRY C. LEES, a citizen of the United States, residing at Camden, in the county of Camden and State of New Jersey, have invented a new and useful Improvement in the Manufacture of Cords and Tassels, of which the following is a specification.

My invention is an improvement in the manufacture of cords and tassels; and it consists in the novel features hereinafter described, and clearly shown in the drawings, forming a part of this specification.

Referring to said drawings, Figure 1 is a side elevation of a cord and tassel constructed in accordance with my invention. Fig. 2 is a sectional view of the same. Fig. 3 is an enlarged view of the cord. Fig. 4 shows the form of a single strand of the material of which the cord and tassel are composed, greatly enlarged.

I form the cord A and tassel B of cotton chenille, that they will have a soft, velvety, or plush effect, and the chenille employed may be the same in color as the curtains with which the cord and tassel are to be used.

The tassel consists of series of circular rows of uncut loops $b$, extending outwardly from the cord A, as shown in the drawings, Fig. 2, to form the balls B', and one or two or more of such balls may be employed, as desired, two being shown, arranged one above the other. The loops $b$ will preferably be longer in the rows adjacent to the center of the ball B', as shown at $b'$, to give the ball a rounded and graceful shape. The said loops $b\,b'$ composing the balls B' are integral, being wound around a central core or wire, which is then wrapped around the cord A, the looped ends extending outwardly.

The skirt or fringe of the tassel consists of a series of elongated uncut loops $b^2$ of cotton chenille, extending downwardly and expanding gradually toward the bottom, giving a very thick and rich appearance, the cord and tassel being, as before stated, composed of cotton chenille, the cut edges of the said cotton chenille giving a soft, plush, or velvety finish to the whole.

I claim as my invention—

1. A cord and tassel composed entirely of cotton chenille and consisting of a series of rows of uncut loops extending from said cord, and a depending uncut fringe, substantially as shown.

2. A cord and tassel composed entirely of cotton chenille and consisting of a series of rows of uncut loops extending from the cord, forming a ball, the loops of the rows adjacent to the center of the ball extending outwardly a greater distance than those of the rows at a distance from said center, and a depending uncut fringe, substantially as shown.

3. A cord and tassel composed entirely of cotton chenille and consisting of a series of rows of uncut loops extending from the cord and forming a ball and a skirt consisting of depending uncut loops, substantially as shown.

4. A cord and tassel composed entirely of cotton chenille and consisting of two separate series of rows of uncut loops, extending outwardly from the cord, forming separate balls, and a series of uncut loops depending from the lower ball, forming the fringe, said depending loops expanding outwardly from top to bottom, substantially as shown.

In testimony whereof I affix my signature in presence of two witnesses.

HENRY C. LEES.

Witnesses:
FRANCIS D. PASTORIUS,
MARTIN V. BERGEN.